US010305813B2

(12) United States Patent
Tamir et al.

(10) Patent No.: US 10,305,813 B2
(45) Date of Patent: May 28, 2019

(54) SOCKET MANAGEMENT WITH REDUCED LATENCY PACKET PROCESSING

(71) Applicant: INTEL CORPORATION, Santa Clara, CA (US)

(72) Inventors: Eliezer Tamir, Bait Shemesh (IL); Eliel Louzoun, Jerusalem (IL); Matthew R. Wilcox, Ottawa (CA)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 15/400,593

(22) Filed: Jan. 6, 2017

(65) Prior Publication Data
US 2017/0214630 A1 Jul. 27, 2017

Related U.S. Application Data

(63) Continuation of application No. 13/966,761, filed on Aug. 14, 2013, now Pat. No. 9,558,132.

(51) Int. Cl.
H04L 12/875 (2013.01)
G06F 13/00 (2006.01)
(Continued)

(52) U.S. Cl.
CPC ............. H04L 47/56 (2013.01); G06F 13/00 (2013.01); G06F 13/24 (2013.01); G06F 13/28 (2013.01); G06F 13/385 (2013.01)

(58) Field of Classification Search
None
See application file for complete search history.

(56) References Cited

U.S. PATENT DOCUMENTS 6,088,740 A 7/2000 Ghaffari
8,924,501 B2 * 12/2014 Tsirkin .................... G06F 9/544
709/213
(Continued)

FOREIGN PATENT DOCUMENTS

JP 2000209216 A 7/2000
JP 2001216170 A 8/2001
(Continued)

OTHER PUBLICATIONS

Office Action received for Japanese Patent Application No. 2014-164077, dated Aug. 4, 2015, 7 pages of English Translation and 6 pages of Japanese Office Action.
(Continued)

Primary Examiner — Kibrom T Hailu
(74) Attorney, Agent, or Firm — Grossman, Tucker, Perreault & Pfleger, PLLC

(57) ABSTRACT

Generally, this disclosure provides systems, methods and computer readable media for management of sockets and device queues for reduced latency packet processing. The method may include maintaining a unique-list comprising entries identifying device queues and an associated unique socket for each of the device queues, the unique socket selected from a plurality of sockets configured to receive packets; busy-polling the device queues on the unique-list; receiving a packet from one of the plurality of sockets; and updating the unique-list in response to detecting that the received packet was provided by an interrupt processing module. The updating may include identifying a device queue associated with the received packet; identifying a socket associated with the received packet; and if the identified device queue is not on one of the entries on the unique-list, creating a new entry on the unique-list, the new (Continued)

entry comprising the identified device queue and the identified socket.

17 Claims, 7 Drawing Sheets

(51) Int. Cl.
    *G06F 13/38*     (2006.01)
    *G06F 13/24*     (2006.01)
    *G06F 13/28*     (2006.01)

(56) References Cited

U.S. PATENT DOCUMENTS

| | | | |
|---|---|---|---|
| 9,009,702 B2* | 4/2015 | Tsirkin | G06F 9/45558 709/224 |
| 2007/0183418 A1 | 8/2007 | Riddoch | |
| 2008/0184238 A1 | 7/2008 | Ruemmier | |
| 2009/0089505 A1* | 4/2009 | Vasudevan | G06F 12/0806 711/118 |
| 2013/0013831 A1 | 1/2013 | Ueno | |
| 2013/0024875 A1* | 1/2013 | Wang | G06F 9/542 719/318 |
| 2013/0110968 A1* | 5/2013 | Horman | H04L 47/15 709/215 |
| 2013/0151743 A1 | 6/2013 | Isrel, Jr. et al. | |
| 2014/0233583 A1 | 8/2014 | Tamir et al. | |

FOREIGN PATENT DOCUMENTS

| | | |
|---|---|---|
| JP | 2007027951 A | 2/2007 |
| JP | 201004470 A | 2/2010 |

OTHER PUBLICATIONS

Corbet, Jonathan, "Low-latency Ethernet device polling," Eklektix, Inc., LWN.net, May 21, 2013, 4 pages.
Chinese Office Action issued in Chinese Application No. 201410401396.0, dated Apr. 1, 2017, with machine English translation, 16 pages.
Office Action issued in U.S. Appl. No. 13/966,761, dated Mar. 30, 2016, 27 pages.
Notice of Allowance issued in U.S. Appl. No. 13/966,761, dated Sep. 29, 2016, 6 pages.

* cited by examiner

SOCKET MANAGEMENT WITH REDUCED LATENCY PACKET PROCESSING

CROSS-REFERENCE TO RELATED APPLICATION

The present application is a continuation of U.S. patent application Ser. No. 13/966,761 filed Aug. 14, 2013, the entire disclosure of which is incorporated herein by reference.

FIELD

The present disclosure relates to packet processing, and more particularly, to management of sockets and associated device queues for reduced latency packet processing with increased numbers of network connections.

BACKGROUND

Network interfaces generally provide data packet transfer capabilities between a network and a host system. The host system may employ a driver module between the network interface and higher layers of an operating system or a user application/program that produces and consumes the data packets. The network interfaces typically generate an interrupt to the driver module to signal a condition that may require the attention of the driver module, for example the completion of a data transfer and/or the availability of newly received packets in a device queue. Network stack processing in the driver module then handles the delivery of packets between the device queues and the higher layers. In some instances, driver scheduling may be timer based rather than interrupt driven. In some environments, network connections may be presented by the system to the user application as an abstraction called a network socket (or just socket).

The interrupt often introduces additional latency in the transfer of packets between the network interface and user applications because it involves a context switch (generic stack processing is typically designed for higher throughput rather than lower latency). Some implementations that reduce latency employ busy-polling, by the system call processing (or the user application or the user space library on behalf of the application), on the device queue that is associated with the socket. When trying to service multiple sockets/connections, however, the effect of busy-polling degrades linearly with the number of sockets and becomes impractically inefficient as the number of sockets increases, for example above several hundred sockets.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, methods and computer readable media for management of sockets and associated device queues for reduced packet processing latency. A system may be configured to provide multiple paths for the determination of network events such as the availability of a data packet. These paths may include a reduced latency busy-polling path and a higher latency, but increased throughput, interrupt or timer driven path. Additionally, a system call module may be configured to maintain a list, referred to as a "unique list," that maps sockets to unique active device queues. A computing system platform, for example, one that hosts many user context applications, may have a relatively large number of open sockets and a relatively large number of hardware device queues. For sockets that are serviced by a single processor (or subset of available processors), however, there may typically be only a few device queues in use at any time. So, for example, while the number of sockets may exceed many thousands, these sockets may be serviced by only one or two device queues per processor, out of the many device queues (possibly hundreds or even thousands) that may exist. The unique list provides a link, for each of the device queues, between that device queue and one socket selected from the many sockets associated with that queue (e.g., providing packets through that queue). Busy-polling may then be limited to the device queues on the unique list for increased efficiency and reduced latency since polling of unnecessary queues consumes additional time, as will be explained in greater detail below.

The reduced latency busy-polling module may be configured to busy-poll the device queues to "feed" events to the stack and system call modules with reduced latency. When there are no currently available events, in response to a request from a user context application, for example an epoll system call in a Linux OS environment (or other suitable operating system), the system call module may busy-poll the queues directly until an event becomes available, thus decreasing the latency along this path.

Although the embodiments described in this disclosure are directed to packets received from a network interface, it will be appreciated that the concepts described herein may be applied to any input/output (I/O) system of relatively high throughput such as, for example, disk I/O.

Figure 1:
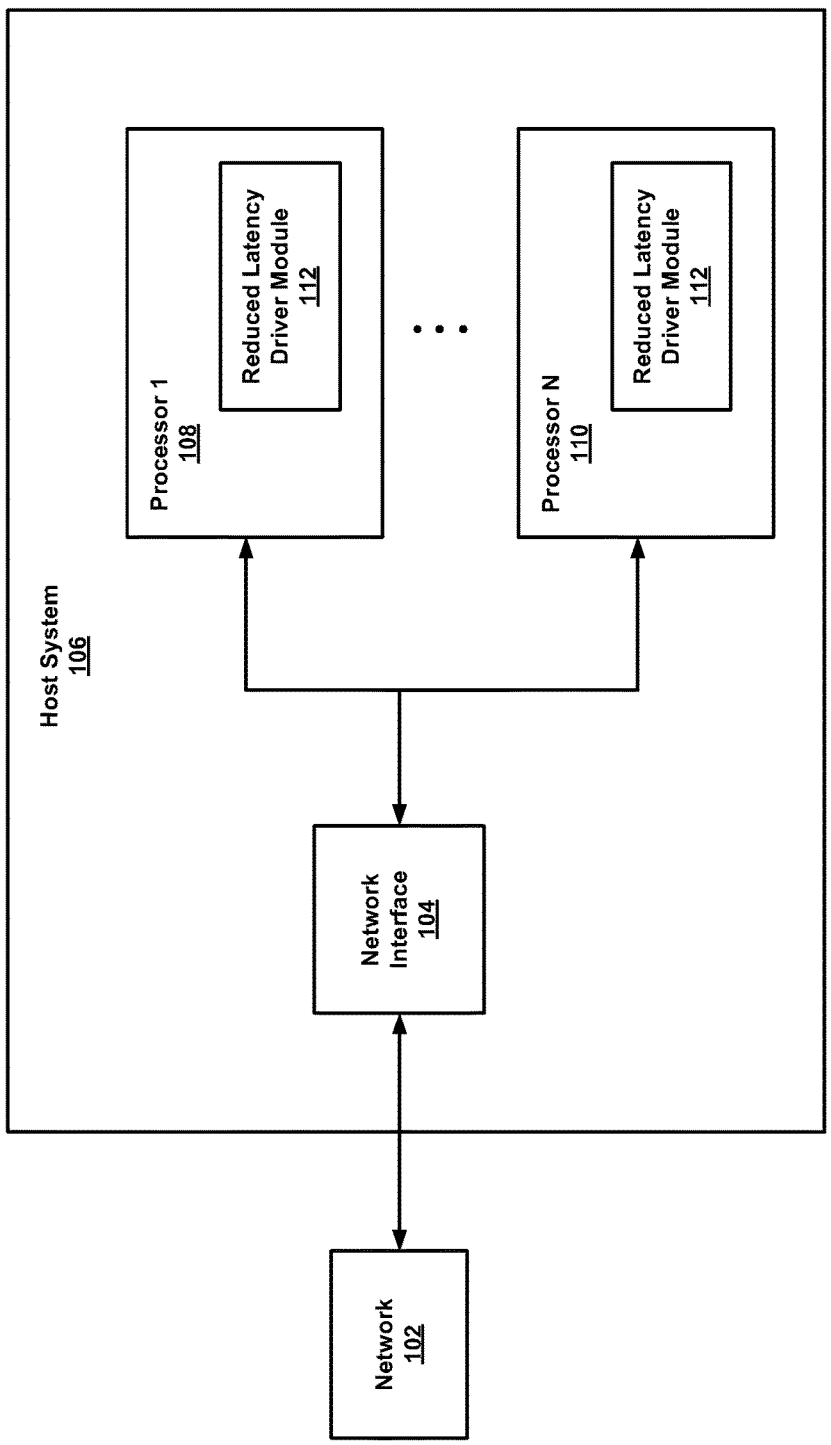
FIG. 1 illustrates a top level system diagram of one example embodiment consistent with the present disclosure.

FIG. 1 illustrates a top level system diagram 100 of one example embodiment consistent with the present disclosure. A network interface 104 is configured to transfer data between a host system 106 and a network 102. The network interface 104 may generally include circuits or modules to process Media Access Control (MAC) layer protocols and Physical (PHY) layer protocols. Network interface 104 may also generally include a Direct Memory Access (DMA) engine. The data transfer may be bi-directional (i.e., data transmitted to the network and/or received from the network). Host system 106 may be any type of computing system or communication device including, for example, a desktop, a workstation, a laptop, a tablet, a phone or smartphone or any type of wired or wireless platform. Host system 106 may include any number of processors (CPUs) 108, 110 or processor cores. A reduced latency device driver module 112, which may reside in host memory, may provide an interface between an operating system (OS), or other software, running on host system 106 and network interface 104.

Driver modules 112 may interface with network interface 104 through the use of data descriptors, control register sets and/or any other suitable means of control, communication and/or event posting, as will be described in greater detail below. Network interface 104 may include any combination of hardware, firmware (including any type of programmable circuitry) and/or software configured to accomplish the transmission and reception of data between the host system 106 and the network 102.

Figure 2:
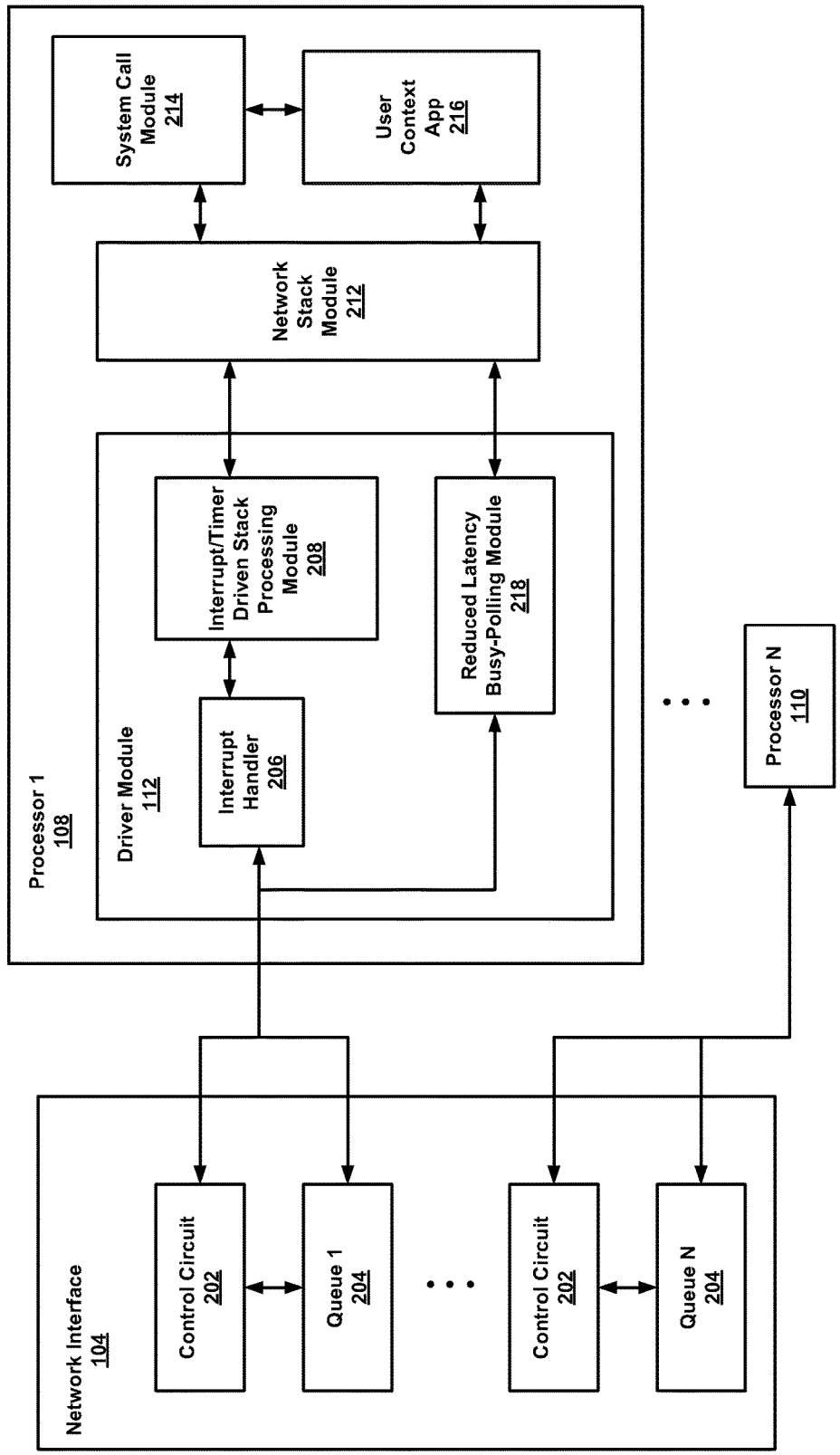
FIG. 2 illustrates a block diagram of one example embodiment consistent with the present disclosure.

FIG. 2 illustrates a block diagram 200 of one example embodiment consistent with the present disclosure. Network interface 104 is shown to include one or more sets of control circuits 202 and data queues 204. In some embodiments, the data queues may reside in memory on the host system 106. The data queues may be ring buffers or other suitable data structures configured to hold data which may include data packets or descriptors that include pointers to the data packets along with other information associated with the data packets. Each set of control circuits 202 and data queues 204 may be associated with one or more corresponding processor 108, 110 on host system 106.

Each processor 108 may host a device driver module 112 that may further include an interrupt handler 206, an interrupt or timer driven stack processing module 208 and a reduced latency busy-polling module 218. The processor 108 may further include a network stack module 212 configured to interface between the driver module 112 and a system call module 214 and a user context application processing module 216. Network stack module 212 may be configured to implement networking protocols such as, for example, transmission control protocol (TCP) or user datagram protocol (UDP). The system call module 214 may be configured to service user requests and monitor sockets for events, in conjunction with the network stack, and the user context application processing module 216, the operations of which will be described in greater detail below. In some embodiments, the interrupt/timer driven stack processing module 208 may employ a semi-polling state machine sometimes referred to as NAPI (an acronym for New API) in connection with implementations of the Linux OS. A NAPI based system may be configured to dynamically switch between interrupt and timer driven processing, depending on system load.

The system call module 214 provides a mechanism so that user context applications 216 may be notified when there is activity (e.g., network events) on the sockets of interest to the application. The network events may be provided by the network stack module 212 and may include an identifier of the socket as well as information regarding the path of the packet to the socket (e.g., module 208 or module 218.

For purposes of the following discussion, epoll, a Linux OS system call, will be used to describe various embodiments consistent with the present disclosure, although the disclosure is not limited to this particular system call implementation or operating system.

The interface between the user application and the epoll system call provides a virtual file to which the user application may add and remove individual file descriptors to be monitored. These files may, for example, be sockets of interest. Although the identity and number of individual sockets of interest to the user may vary over time, the epoll virtual file will typically be a persistent context that references some number of file descriptors/sockets that are being monitored. This persistent context enables the use of more sophisticated data structures and more efficient processing, as will be described below.

The reduced latency busy-polling module 218 may be configured to monitor, for each socket that receives packets from a supported device, the device queue from which the socket most recently received a packet. This information is used to activate busy-polling on that queue when a read or poll request from the user application has nothing to report. Queues that have busy-poll activated are repeatedly checked, for example in a round robin fashion, by the system call module 214 for the availability of new packets, events or other data.

Figure 3A:
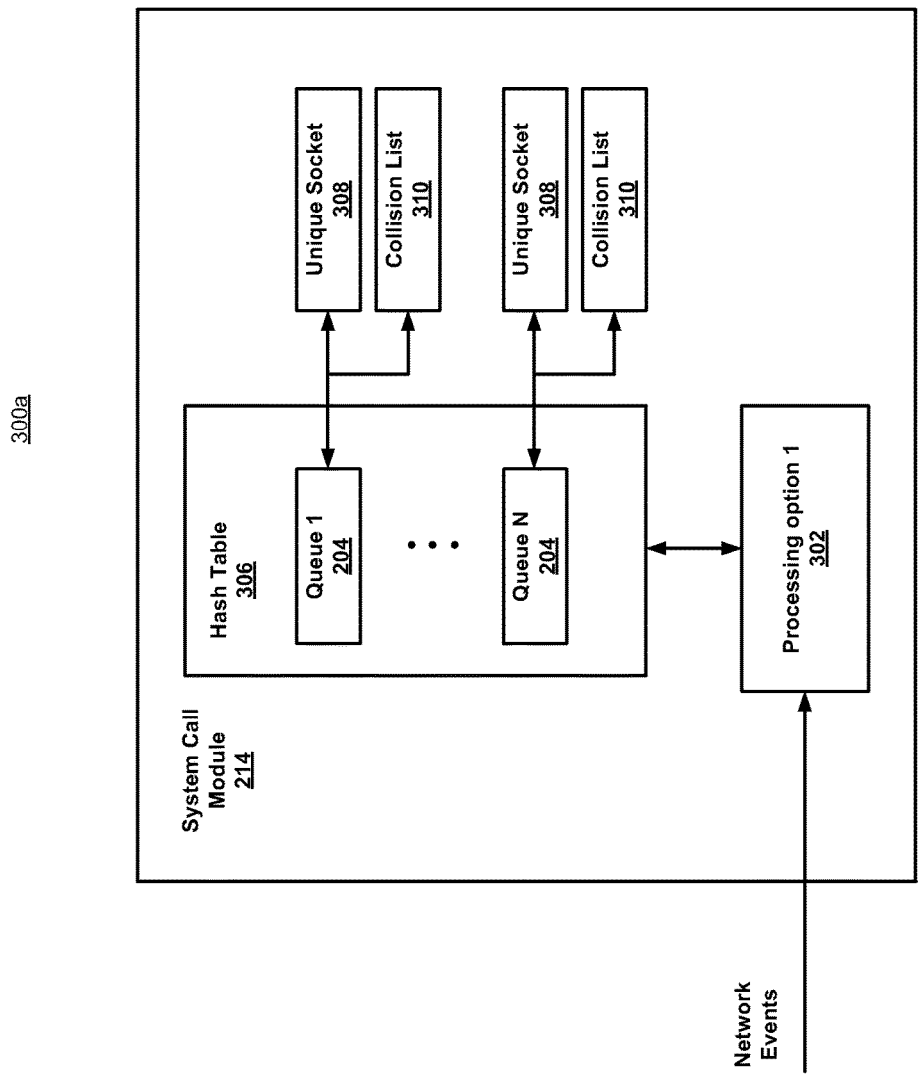
FIG. 3(a) illustrates a block diagram of another example embodiment consistent with the present disclosure.
Figure 3B:
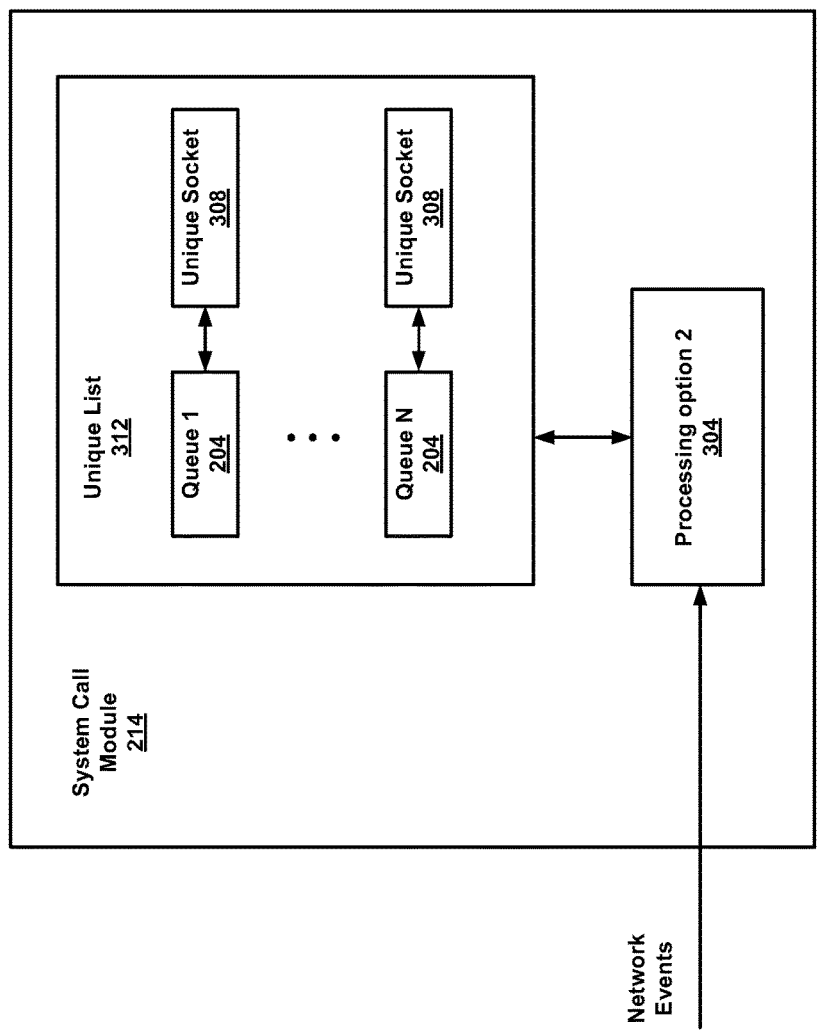
FIG. 3(b) illustrates a block diagram of another example embodiment consistent with the present disclosure.

FIG. 3(*a*) illustrates a block diagram 300*a* of another example embodiment consistent with the present disclosure. The system call module 214 may be configured to handle network events and to interact with socket processing in a network stack, for example through a mechanism such as epoll described above. System call module 214 may be implemented using processing option 1 302 which employs a hash table 306 for each epoll context. Each entry of the hash table is associated with one of the device queues 204 (if that device queue has sockets that are being monitored), and is linked to a unique socket 308 and a collision list 310, the operations of which will be explained below in connection with the flowchart illustrated in FIG. 4.

FIG. 3(*b*) illustrates a block diagram 300*b* of another example embodiment consistent with the present disclosure. System call module 214 may be implemented using processing option 2 304 which employs a unique list 312 linking each device queue 204 to a unique socket identifier 308, the operations of which will be explained below in connection with the flowchart illustrated in FIG. 5.

It will be appreciated that in some embodiments, other types of data structures may be used instead of hash tables or lists. Any suitable data structure may be used, or, for example, two levels of hash tables may be used, or an implementation may use lists instead of hash tables.

Figure 4:
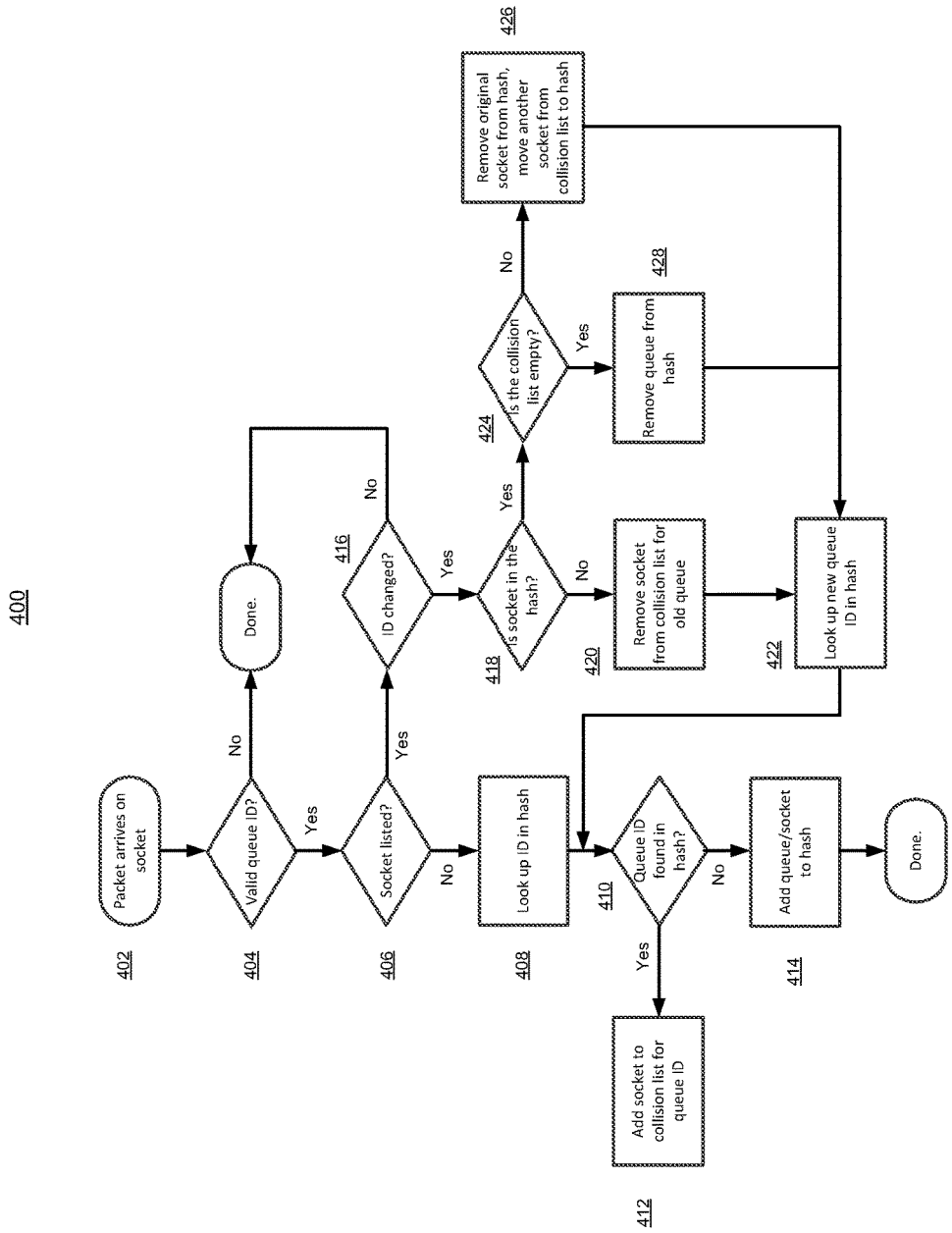
FIG. 4 illustrates a flowchart of operations of one example embodiment consistent with the present disclosure.

FIG. 4 illustrates a flowchart of operations 400 of one example embodiment consistent with the present disclosure. Processing option 1 302 of 300*a* is illustrated as a flowchart of operations 400 performed, for example by epoll, in response to the arrival of network events. This embodiment identifies the sockets associated with each epoll instance and maintains a hash table 306, with an entry for each device queue that feeds one or more of the sockets that are being monitored. These entries map the device queue to a unique socket 308 and a collision list 310. The list may be implemented as a linked list for example, which provides increased efficiency for adding and deleting entries when their location in the list is known, as will be the case in this embodiment. When a new socket is registered through epoll, the device queue associated with that socket is identified. If a hash entry does not yet exist for that queue, one is created and added to the table and the socket is linked to it. This socket becomes the "unique" socket 308 for that queue. Alternatively, if the hash entry for that queue already existed then the socket is added to a collision list 310 of sockets that are associated with that queue.

When a socket is removed, from an epoll context, a check is performed to determine if the socket was on the collision list for that device queue or if the socket was a unique socket for that queue. If the socket is on the collision list it is removed from the list. If the socket is a unique socket for that queue and there are no other sockets on the collision list for that queue then the entry in the hash table for that queue is deleted. If, however, there were other sockets on the collision list then one of those sockets is removed from the collision list and linked to the hash table to become the new unique socket for that queue.

Reduced latency busy-polling module 218 and/or system call module 214 may limit polling to the device queues that are listed in the hash table 306.

If the device queue associated with a socket changes, the socket may first be removed, as described above, and then re-registered using the new queue.

At operation 402, a packet arrives on a socket from a device queue. At operation 404, the device queue identity (ID) is verified to be valid. This is done because some devices may not be configured to support the features of the embodiments described in the present disclosure, or the option may simply be disabled (e.g., turned off by a system administrator) for the device. At operation 406, a check is performed to determine if the socket is on the collision list for that queue. If not, then at operations 408, 410 the hash table entry for the queue is found and if the socket is not linked to the queue as a unique socket then it is added to the collision list at operation 412. If there is no hash table entry for this queue then a new entry is added at operation 414 and the socket is linked to it as the unique socket.

The association of a socket with a queue can change dynamically, for example when packets come from another network device (e.g., due to a routing change) or when queue assignments change on a network device. If the device queue associated with a socket change, as determined at operation 416, then the socket is removed from that device queue hash table entry or associated collision list, at operations 418 through 428, and then re-registered with a new queue ID beginning at operation 410.

Figure 5:
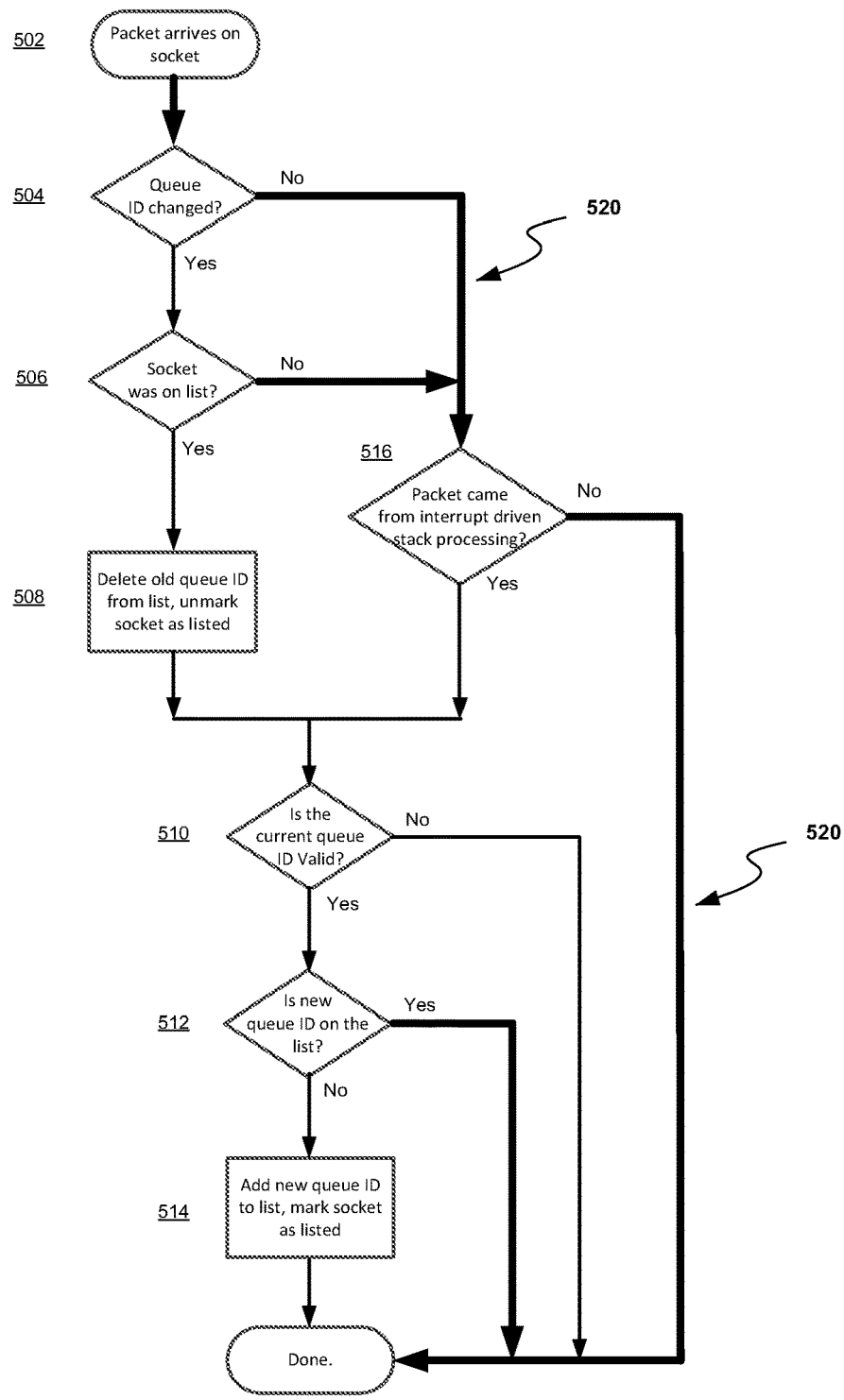
FIG. 5 illustrates a flowchart of operations of another example embodiment consistent with the present disclosure.

FIG. 5 illustrates a flowchart of operations 500 of another example embodiment consistent with the present disclosure. Processing option 2 304 of 300b is illustrated as a flowchart of operations 500 performed, for example by epoll, in response to the arrival of network events. In this embodiment, only unique sockets are identified and tracked, on the unique list 312, which creates a unique mapping between active device queues and sockets associated with those queues. In other words, the unique list 312 lists the unique queues for the sockets monitored by an epoll context, linking them to a single socket that is backed (fed) by that queue. Although there may be many sockets, for which the network stack expects packets or events to arrive from any device queue, only the first socket found for each queue is tracked, i.e., the unique socket. In this embodiment, the need to maintain a collision list is avoided. The unique list 312 may be implemented as a linked list to facilitate the addition and deletion of entries.

When a packet arrives at a socket, a determination is made as to whether the packet came through the interrupt/timer driven stack processing module 208 (e.g., a first path) or through the reduced latency busy-polling module 218 (e.g., a second path). If the packet came through the interrupt/timer driven stack processing module 208, a check is made to determine if that queue is on the unique list 312 and if not, the queue and socket are added. This check may be a relatively expensive test, computationally, since a large number of packets may need to be checked. Packets that are arriving through the second path, the reduced latency busy-polling module 218, are known to be coming from a queue that is being polled (busy-polling activated) and therefore do not need to be tested. Additionally, when busy-polling is active, most packets (typically more than 99.9% of packets) will arrive through the reduced latency busy-polling module 218 resulting in increased efficiency. Because there are a relatively few packets that come through the interrupt/timer driven stack processing module 208, when busy-polling is active, the expensive socket testing (searching the unique list) may be postponed until packets come through the interrupt path (first path) two consecutive times. This may reduce the incidence of false positive testing from a nominal 0.1% down to a nominal 0.0001% rate.

If the device queue associated with a socket changes, and the socket was on the unique list it may be removed from the list. If there are other sockets that use that device queue, one of them will subsequently be added as a result of the processing on that socket which will detect that it was not serviced through the reduced latency path (e.g., provided through the interrupt path two consecutive times).

Reduced latency busy-polling module 218 and/or system call module 214 may limit polling to the device queues that are listed in the unique list 312.

At operation 502, a packet arrives on a socket from a device queue. At operations 504, 506 if the device queue associated with the socket changed (e.g., the device queue ID changed) and if the socket was on the unique list 312, then at operation 508, the old device queue ID and the associated socket are removed from the list and the procedure continues at operation 510. Otherwise, at operation 516, if the packet did not arrive through the interrupt/timer driven stack processing module 208, the procedure is complete and the packet will have been handled correctly by the reduced latency busy-polling module 218.

If, however, the packet did arrive through the interrupt/timer driven stack processing module 208, then, at operations 510, 512 if the device queue ID is valid but not on the list, the device queue and socket will be added to the list at operation 514 and the procedure is completed.

The bold lines on the flowchart, for example 520, indicate the path that will typically be executed for most packets, for example more than 90% of the packets.

In some embodiments, hardware support may be provided to poll the device queues with greater efficiency. Each epoll instance may be associated with a hardware event queue that is linked to hardware data queues that are currently in use by that epoll instance. These hardware data queues are the queues on which epoll expects network data and events to arrive for the sockets that it is monitoring, for example the sockets on the unique list. The hardware event queue may be configured to receive notifications that are generated when any of the associated hardware data queues has an available event. The hardware data queues may be added or removed from the event queue for the epoll instance as that epoll adds and removes sockets of interest. The list of data queues to be monitored may be maintained, for example, as described in connection with FIGS. 3(a) and 3(b).

Alternatively, in some embodiments, hardware support may be provided through a status register (or other data structure) that can be updated by the devices. The contents of the register may be replicated in a host memory location that is convenient for the CPU/OS to monitor. The register may contain a status bit for each of the hardware device queues that are associated with a given epoll instance (or processor). The status bit for a queue may be set when there is activity on the queue (e.g., events). The bit may be cleared automatically, after the expiration of a timeout, or after the driver has acknowledged the event, either directly, by writing to the register, or indirectly, by updating the queue state through processing of the incoming packets. Alternatively, the status bit may be toggled (from on to off and off to on) in response to an event. In this embodiment only one location is polled, the register (or the host memory copy of its value) that effectively represents all of the sockets, which increases efficiency. Here again, the list of data queues to be monitored may be maintained, for example, as described in connection with FIGS. 3(a) and 3(b).

In some embodiments, the system call module 214 may execute monitor and mwait instructions (op-codes) on the processor. The monitor and mwait instructions may be configured to place the processor into an idle or sleep mode that is triggered to wake when a CPU cache line containing the above mentioned status data structure is written to. This may be a more power efficient alternative to busy-polling of the device queues. In some embodiments the mwait instruction may be a timed mwait instruction. The timed mwait instruction may be configured with a time limiting mechanism, such as, for example, to trigger a wake after a time threshold has expired. Although the mwait instruction may be used to wait on each of the device queues, in embodiments where the status register is provided, as described above, the mwait instruction may be used to wait on just the status register.

Figure 6:
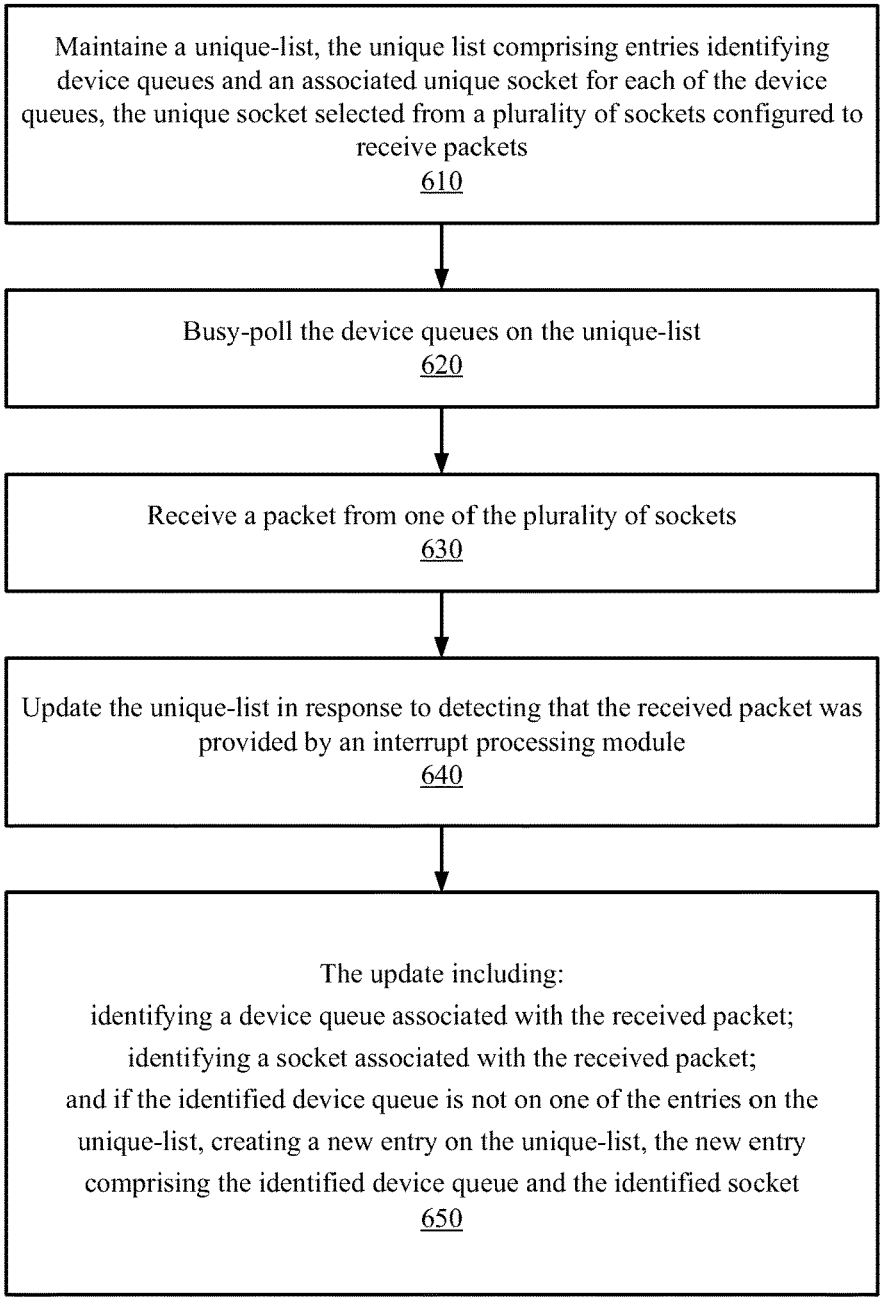
FIG. 6 illustrates a flowchart of operations of another example embodiment consistent with the present disclosure.

FIG. 6 illustrates a flowchart of operations 600 of another example embodiment consistent with the present disclosure. The operations provide a method for management of sockets and associated device queues for reduced packet processing latency. At operation 610, a unique-list is maintained. The unique list includes entries identifying device queues and an associated unique socket for each of the device queues, the unique socket selected from a plurality of sockets configured to receive packets. At operation 620, the device queues on the unique-list are busy-polled. At operation 630, a packet is received from one of the plurality of sockets. At operation 640, the unique-list is updated in response to detecting that the received packet was provided by an interrupt processing module. At operation 650, the updating includes: identifying a device queue associated with the received packet; identifying a socket associated with the received packet; and if the identified device queue is not on one of the entries on the unique-list, creating a new entry on the unique-list, the new entry comprising the identified device queue and the identified socket.

One illustrative embodiment of source code software is presented in Appendix A.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry," as used in any embodiment herein, may include, for example, singly or in any combination, hard-wired circuitry, programmable circuitry, state machine circuitry, and/or firmware that stores instructions executed by programmable circuitry. In some embodiments, circuitry may be implemented as software or any suitable set of programmable operations. An app may be embodied as code or instructions which may be executed on programmable circuitry such as a host processor or other programmable circuitry. A module, as used in any embodiment herein, may be embodied as circuitry, firmware, software or any combination thereof. The circuitry may be embodied as an integrated circuit, such as an integrated circuit chip.

Thus, the present disclosure provides systems, methods and computer readable media for management of sockets and associated device queues for reduced latency packet processing. The following examples pertain to further embodiments.

The system may include a system call module configured to maintain a unique-list, the unique list including entries identifying device queues and an associated unique socket for each of the device queues, the unique socket selected from a plurality of sockets configured to receive packets. The system of this example may also include a reduced latency busy-polling module configured to busy-poll the device queues on the unique-list. The system of this example may further include a network stack module configured to receive a packet from one of the plurality of sockets. The system call module of this example may further be configured to update the unique-list in response to detecting that the received packet was provided by an interrupt processing module, the updating including: identifying a device queue associated with the received packet; identifying a socket associated with the received packet; and if the identified device queue is not on one of the entries on the unique-list, creating a new entry on the unique-list, the new entry including the identified device queue and the identified socket.

Another example device includes the forgoing components and the system call module is further configured to delay the updating of the unique-list until detection of a second consecutively received packet provided by the interrupt processing module.

Another example device includes the forgoing components and the system call module is further configured to: detect a change in association between a socket and a device queue; determine if the changed socket is on one of the entries on the unique-list; and in response to the determination, remove the entry including the changed socket from the unique-list.

Another example device includes the forgoing components and the interrupt processing module is timer driven.

Another example device includes the forgoing components and further includes a hardware event queue configured to generate notifications in response to the availability of an event in the device queues on the unique-list, and the busy-polling includes receiving the notifications.

Another example device includes the forgoing components and the busy-polling includes executing a monitor instruction and an mwait instruction on a processor associated with a cache line including the hardware event queue, the monitor and mwait instructions configured to transition the processor to a sleep state, the sleep state terminating in response to a modification of the hardware event queue.

Another example device includes the forgoing components and further includes a status register including status bits, each of the status bits associated with a device queue on the unique-list, the status bits set to indicate availability of an event in the device queues on the unique-list, and the busy-polling includes monitoring the status register.

Another example device includes the forgoing components and the busy-polling includes executing a monitor instruction and an mwait instruction on a processor associated with a cache line including the status register, the monitor and mwait instructions configured to transition the processor to a sleep state, the sleep state terminating in response to a modification of the status bits.

According to another aspect there is provided a method. The method may include maintaining a unique-list, the unique list including entries identifying device queues and an associated unique socket for each of the device queues, the unique socket selected from a plurality of sockets configured to receive packets. The method of this example may also include busy-polling the device queues on the unique-list. The method of this example may further include receiving a packet from one of the plurality of sockets. The method of this example may further include updating the unique-list in response to detecting that the received packet was provided by an interrupt processing module, the updating including: identifying a device queue associated with the received packet; identifying a socket associated with the received packet; and if the identified device queue is not on one of the entries on the unique-list, creating a new entry on the unique-list, the new entry including the identified device queue and the identified socket.

Another example method includes the forgoing operations and further includes delaying the updating of the unique-list until detection of a second consecutively received packet provided by the interrupt processing module.

Another example method includes the forgoing operations and further includes detecting a change in association between a socket and a device queue; determining if the changed socket is on one of the entries on the unique-list; and in response to the determination, removing the entry including the changed socket from the unique-list.

Another example method includes the forgoing operations and the busy-polling further includes receiving notifications from a hardware event queue configured to generate the notifications in response to the availability of an event in the device queues on the unique-list.

Another example method includes the forgoing operations and further includes executing a monitor instruction and an mwait instruction on a processor associated with a cache line including the hardware event queue, the monitor and mwait instructions configured to transition the processor to a sleep state, the sleep state terminating in response to a modification of the hardware event queue.

Another example method includes the forgoing operations and the busy-polling further includes monitoring a status register, the status register including status bits, each of the status bits associated with a device queue on the unique-list, the status bits set to indicate availability of an event in the device queues on the unique-list.

Another example method includes the forgoing operations and further includes executing a monitor instruction and an mwait instruction on a processor associated with a cache line including the status register, the monitor and mwait instructions configured to transition the processor to a sleep state, the sleep state terminating in response to a modification of the status bits.

According to another aspect there is provided a method. The method may include maintaining a hash table configured to map device queues to a unique socket and to a collision list of additional sockets, the unique socket and the additional sockets associated with the device queue. The method of this example may also include busy-polling the device queues on the hash table. The method of this example may further include receiving a new socket registration from a polling system call. The method of this example may further include identifying a device queue associated with the new socket. The method of this example may further include, if the identified device queue is not in the hash table, creating a new entry in the hash table for the identified device queue, the new entry including the new socket as the unique socket and further including an empty collision list. The method of this example may further include, if the identified device queue is in the hash table, adding the new socket to the collision list for the device queue entry in the hash table.

Another example method includes the forgoing operations and further includes: detecting a change in association between a socket and a device queue; if the changed socket is on the collision list associated with the device queue, removing the changed socket from the collision list; if the changed socket is the unique socket associated with the device queue and the collision list associated with the device queue is empty, deleting the entry in the hash table for the device queue; and if the changed socket is the unique socket associated with the device queue and the collision list associated with the device queue is not empty, replacing the unique socket associated with the device queue with one of the sockets on the collision list.

Another example method includes the forgoing operations and further includes and the busy-polling further includes receiving notifications from a hardware event queue configured to generate the notifications in response to the availability of an event in the device queues on the unique-list.

Another example method includes the forgoing operations and further includes executing a monitor instruction and an mwait instruction on a processor associated with a cache line including the hardware event queue, the monitor and mwait instructions configured to transition the processor to a sleep state, the sleep state terminating in response to a modification of the hardware event queue.

Another example method includes the forgoing operations and the busy-polling further includes monitoring a status register, the status register including status bits, each of the status bits associated with a device queue on the unique-list, the status bits set to indicate availability of an event in the device queues on the unique-list.

Another example method includes the forgoing operations and further includes executing a monitor instruction and an mwait instruction on a processor associated with a cache line including the status register, the monitor and mwait instructions configured to transition the processor to a sleep state, the sleep state terminating in response to a modification of the status bits.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for reduced latency packet processing, comprising:
   memory circuitry having stored thereon instructions;
   a processor to execute the instructions, the processor including:
      system call circuitry to maintain a hash table, the hash table comprising at least:
         a first entry, the first entry identifying:
            a first device queue;
            a first unique socket associated with the first device queue; and
            a first collision list associated with the first device queue, the first collision list comprising a first set of additional sockets associated with the first device queue; and
         a second entry, the second entry identifying:
            a second device queue;
            a second unique socket associated with the second device queue; and
            a second collision list associated with the second device queue, the second collision list comprising a second set of additional sockets associated with the second device queue;
      reduced latency busy-polling circuitry to busy-poll the first and second device queues based on the first and second unique sockets, respectively; and
      network stack circuitry to receive a packet from a socket.

2. The system of claim 1, wherein the system call circuitry is further to:
   receive a new socket registration from a polling system call; and
   wherein, in response to the received new socket registration, the system call circuitry is further to update the hash table, the updating comprising:
      identifying a device queue associated with the new socket;
      wherein, responsive to the hash table not comprising an entry for the identified device queue:
         creating a new entry in the hash table for the identified device queue, the new entry comprising the new socket as a unique socket and the new entry further comprising an empty collision list; and
      wherein, responsive to the hash table comprising an entry for the identified device queue:
         adding the new socket to a collision list associated with the identified device queue.

3. The system of claim 1, wherein the system call circuitry is further to:
   detect a change in association between:
      a socket of the first collision list and the first device queue; or
      a socket of the second collision list and the second device queue; and
   responsive to the detected change in association, remove the changed socket from the corresponding collision list.

4. The system of claim 3, wherein the system call circuitry is further to re-register the changed socket, the re-registering comprising:
   identifying a device queue associated with the changed socket;
   wherein, responsive to the hash table not comprising an entry for the identified device queue:
      creating a new entry in the hash table for the identified device queue, the new entry comprising the changed socket as a unique socket and the new entry further comprising an empty collision list; and
   wherein, responsive to the hash table comprising an entry for the identified device queue:
      adding the changed socket to a collision list associated with the identified device queue.

5. The system of claim 1, wherein the system call circuitry is further to:
   detect a change in association between:
      the first unique socket and the first device queue; or
      the second unique socket and the second device queue;
   responsive to the detected change in association, remove the unique socket corresponding to the changed socket from the corresponding device queue;
   wherein, responsive to the collision list associated with the device queue of the removed socket being empty:
      delete the device queue entry from the hash table; and
   wherein, responsive to the collision list associated with the device queue of the removed socket containing at least one socket:
      select a socket from the collision list;
      remove the selected socket from the collision list; and
      link the selected socket to the hash table to become a new unique socket for the device queue.

6. A non-transitory computer-readable storage medium having instructions stored thereon which when executed by a processor result in operations for reduced latency packet processing, the operations comprising:
   maintain a hash table to map device queues to unique sockets and to collision lists of additional sockets, each unique socket and corresponding additional sockets associated with a device queue;
   busy-poll the device queues on the hash table;
   receive a new socket registration from a polling system call;
   identify a device queue associated with the new socket;
   wherein, responsive to the hash table not comprising an entry for the identified device queue:
      create a new entry in the hash table for the identified device queue, the new entry comprising the new socket as the unique socket and further comprising an empty collision list; and
   wherein, responsive to the hash table comprising an entry for the identified device queue:
      add the new socket to the collision list for the device queue entry in the hash table.

7. The non-transitory computer-readable storage medium of claim 6, having additional instructions stored thereon which, when executed by the processor, result in further operations comprising:
  detect a change in association between a socket and a device queue;
  wherein, responsive to the collision list associated with the device queue including the changed socket:
    remove the changed socket from the collision list;
  wherein, responsive to the unique socket associated with the device queue comprising the changed socket and the collision list associated with the device queue being empty:
    delete the entry in the hash table for the device queue; and
  wherein, responsive to the unique socket associated with the device queue comprising the changed socket and the collision list associated with the device queue comprising at least one socket:
    replace the unique socket associated with the device queue with one of the sockets on the collision list.

8. The non-transitory computer-readable storage medium of claim 6, wherein the operation busy-poll the device queues on the hash table includes operations comprising:
  receive notifications from a hardware event queue to generate the notifications in response to the availability of an event in the device queues on the hash table.

9. The non-transitory computer-readable storage medium of claim 8 having further instructions comprising a monitor instruction and an mwait instruction stored thereon, wherein:
  the monitor and mwait instructions are associated with a cache line comprising the hardware event queue; and
  the monitor and mwait instructions, when executed by the processor, result in additional operations comprising:
    transition the processor to a sleep state, the sleep state terminating in response to a modification of the cache line.

10. The non-transitory computer-readable storage medium of claim 6, wherein the operation busy-poll the device queues on the hash table includes operations comprising:
  monitor a status register, the status register comprising status bits, each of the status bits associated with a device queue on the hash table, the status bits set to indicate availability of an event in the device queues on the hash table.

11. The non-transitory computer-readable storage medium of claim 10 having further instructions comprising a monitor instruction and an mwait instruction stored thereon, wherein:
  the monitor and mwait instructions are associated with a cache line comprising the hardware event queue; and
  the monitor and mwait instructions, when executed by the processor, result in additional operations comprising:
    transition the processor to a sleep state, the sleep state terminating in response to a modification of the cache line.

12. A method for reduced latency packet processing, the method comprising:
  maintaining, via system call circuitry, a hash table to map device queues to unique sockets and to collision lists of additional sockets, each unique socket and corresponding additional sockets associated with a device queue;
  busy-polling, via reduced latency busy-polling circuitry, the device queues on the hash table;
  receiving, via the system call circuitry, a new socket registration from a polling system call;
  identifying, via the system call circuitry, a device queue associated with the new socket; and
  wherein, responsive to the hash table not comprising an entry for the identified device queue:
    creating, via the system call circuitry, a new entry in the hash table for the identified device queue, the new entry comprising the new socket as the unique socket and further comprising an empty collision list; and
  wherein, responsive to the hash table comprising an entry for the identified device queue:
    adding, via the system call circuitry, the new socket to the collision list for the device queue entry in the hash table.

13. The method of claim 12, further comprising:
  detecting, via the system call circuitry, a change in association between a socket and a device queue;
  wherein, responsive to the collision list associated with the device queue including the changed socket:
    removing, via the system call circuitry, the changed socket from the collision list;
  wherein, responsive to the unique socket associated with the device queue comprising the changed socket and the collision list associated with the device queue being empty:
    deleting, via the system call circuitry, the entry in the hash table for the device queue; and
  wherein, responsive to the unique socket associated with the device queue comprising the changed socket and the collision list associated with the device queue comprising at least one socket:
    replacing, via the system call circuitry, the unique socket associated with the device queue with one of the sockets on the collision list.

14. The method of claim 12, wherein busy-polling, via reduced latency busy-polling circuitry, the device queues on the hash table comprises at least:
  receiving, via the reduced latency busy-polling circuitry, notifications from a hardware event queue to generate the notifications in response to the availability of an event in the device queues on the hash table.

15. The method of claim 14, further comprising executing, via the reduced latency busy-polling circuitry, a monitor instruction and an mwait instruction on a processor, wherein:
  the monitor and mwait instructions are associated with a cache line comprising the hardware event queue; and
  the monitor and mwait instructions are to transition the processor to a sleep state, the sleep state terminating in response to a modification of the cache line.

16. The method of claim 12, wherein busy-polling, via reduced latency busy-polling circuitry, the device queues on the hash table comprises at least:
  monitoring, via the reduced latency busy-polling circuitry, a status register, the status register comprising status bits, each of the status bits associated with a device queue on the hash table, the status bits set to indicate availability of an event in the device queues on the hash table.

17. The method of claim 16, further comprising executing, via the reduced latency busy-polling circuitry, a monitor instruction and an mwait instruction on a processor, wherein:
  the monitor and mwait instructions are associated with a cache line comprising the hardware event queue; and the monitor and mwait instructions are to transition the processor to a sleep state, the sleep state terminating in response to a modification of the cache line.

* * * * *